United States Patent [19]
Rasmussen et al.

[11] Patent Number: 5,732,106
[45] Date of Patent: Mar. 24, 1998

[54] PULSE-SHAPING FILTER FOR MODULATOR MONOLITHIC INTEGRATION

[75] Inventors: Donald J. Rasmussen; Daniel J. Schwarz, both of Fort Wayne, Ind.

[73] Assignee: ITT Corporation, New York, N.Y.

[21] Appl. No.: 465,444

[22] Filed: Jun. 5, 1995

[51] Int. Cl.⁶ .............. H04K 1/02; H04L 25/03; H04L 25/44

[52] U.S. Cl. .............. 375/296; 375/306; 327/129

[58] Field of Search .............. 375/296, 295, 375/306, 269, 272, 303; 327/107, 129; 332/101, 104

[56] References Cited

U.S. PATENT DOCUMENTS

| | | | |
|---|---|---|---|
| 3,997,855 | 12/1976 | Nash | 375/303 |
| 4,596,022 | 6/1986 | Stoner | 375/272 |
| 4,748,640 | 5/1988 | Staley et al. | 375/306 |
| 5,446,760 | 8/1995 | Bienz et al. | 375/295 |

*Primary Examiner*—Stephen Chin
*Assistant Examiner*—Betsy Lee Deppe
*Attorney, Agent, or Firm*—Plevy & Associates

[57] ABSTRACT

Disclosed is a digital pulse shaping circuit for reducing undesirable frequency components in subsequent data modulated transmissions, which circuit can be easily manufactured as a monolithic integrated circuit. In a preferred embodiment, the pulse shaping circuit employs an edge detector circuit to detect data transitions of an incoming serial data stream. Upon a data edge detection, the edge detector provides a control signal to a digital counter to enable the counter to begin counting applied clock pulses and generate a linear count. The linear count is provided to a decoding circuit, which generates an output word as a nonlinear function of the value of the count. The decoded output word then drives a digital modulator which modulates an RF carrier to provide wireless data transmission with improved spectral efficiency.

21 Claims, 6 Drawing Sheets

OFFSET BINARY NOTATION

| B4 | B3 | B2 | B1 | B0 | DECIMAL VALUE | K9 | K8 | K7 | K6 | K5 | K4 | K3 | K2 | K1 | K0 | DECIMAL VALUE | NORMALIZED DECIMAL VALUE |
|----|----|----|----|----|---------------|----|----|----|----|----|----|----|----|----|----|---------------|--------------------------|
| 0  | 0  | 1  | 0  | 1  | 5             | 1  | 1  | 1  | 1  | 1  | 1  | 1  | 1  | 1  | 1  | 1023          | +1.000                   |
| 0  | 0  | 1  | 1  | 0  | 6             | 1  | 1  | 1  | 1  | 1  | 1  | 1  | 1  | 1  | 1  | 1023          | +1.000                   |
| 0  | 1  | 1  | 1  | 1  | 7             | 1  | 1  | 1  | 1  | 1  | 1  | 1  | 0  | 0  | 1  | 1017          | +0.987                   |
| 0  | 1  | 0  | 0  | 0  | 8             | 1  | 1  | 1  | 1  | 1  | 0  | 1  | 0  | 1  | 0  | 1002          | +0.958                   |
| 0  | 1  | 0  | 0  | 1  | 9             | 1  | 1  | 1  | 1  | 1  | 0  | 1  | 1  | 1  | 0  | 974           | +0.903                   |
| 0  | 1  | 0  | 1  | 0  | 10            | 1  | 1  | 0  | 0  | 1  | 0  | 0  | 0  | 1  | 0  | 930           | +0.818                   |
| 0  | 1  | 0  | 1  | 1  | 11            | 1  | 0  | 0  | 0  | 1  | 0  | 1  | 1  | 1  | 0  | 871           | +0.703                   |
| 0  | 1  | 1  | 0  | 0  | 12            | 1  | 0  | 0  | 0  | 0  | 0  | 0  | 1  | 0  | 1  | 797           | +0.550                   |
| 0  | 1  | 1  | 0  | 1  | 13            | 1  | 0  | 0  | 1  | 1  | 0  | 0  | 1  | 1  | 0  | 710           | +0.387                   |
| 0  | 1  | 1  | 1  | 0  | 14            | 1  | 1  | 0  | 0  | 0  | 0  | 0  | 1  | 0  | 1  | 613           | +0.198                   |
| 0  | 1  | 1  | 1  | 1  | 15            | 1  | 0  | 0  | 0  | 0  | 0  | 0  | 0  | 0  | 0  | 512           | 0.0                      |
| 1  | 0  | 0  | 0  | 0  | 16            | 0  | 0  | 1  | 1  | 0  | 1  | 1  | 0  | 1  | 0  | 410           | -0.198                   |
| 1  | 0  | 0  | 0  | 1  | 17            | 0  | 1  | 0  | 0  | 1  | 1  | 1  | 0  | 0  | 1  | 313           | -0.387                   |
| 1  | 0  | 0  | 1  | 0  | 18            | 0  | 1  | 1  | 1  | 0  | 0  | 1  | 0  | 1  | 0  | 226           | -0.550                   |
| 1  | 0  | 0  | 1  | 1  | 19            | 0  | 0  | 0  | 0  | 0  | 1  | 1  | 0  | 0  | 0  | 152           | -0.703                   |
| 1  | 0  | 1  | 0  | 0  | 20            | 0  | 0  | 0  | 0  | 0  | 0  | 0  | 1  | 0  | 1  | 93            | -0.818                   |
| 1  | 0  | 1  | 0  | 1  | 21            | 0  | 0  | 0  | 0  | 0  | 0  | 1  | 1  | 0  | 1  | 49            | -0.903                   |
| 1  | 0  | 1  | 1  | 0  | 22            | 0  | 0  | 0  | 0  | 0  | 0  | 0  | 1  | 0  | 1  | 21            | -0.958                   |
| 1  | 0  | 1  | 1  | 1  | 23            | 0  | 0  | 0  | 0  | 0  | 0  | 0  | 0  | 0  | 0  | 6             | -0.987                   |
| 1  | 1  | 0  | 0  | 0  | 24            | 0  | 0  | 0  | 0  | 0  | 0  | 0  | 0  | 0  | 0  | 0             | -1.000                   |
| 1  | 1  | 0  | 0  | 1  | 25            | 0  | 0  | 0  | 0  | 0  | 0  | 0  | 0  | 0  | 0  | 0             | -1.000                   |

↑ MIN. COUNT (row decimal value 5)
↑ PRESENT COUNT (row decimal value 15)
↑ MAX. COUNT (row decimal value 25)

K9 = MSB, K0 = LSB

1

PULSE-SHAPING FILTER FOR MODULATOR MONOLITHIC INTEGRATION

FIELD OF THE INVENTION

The present invention relates generally to wireless data communication and more particularly, to a data pulse shaping circuit to reduce transmitted power at frequencies outside an allocated frequency band.

BACKGROUND OF THE INVENTION

In the broad field of wireless data communication which encompasses mobile cellular phones, wireless facsimile, wireless computer data transmissions and so on, a fundamental concern is the undesirable transmission of radio frequency (RF) power at frequencies outside one's allocated frequency band. The transmitted frequency spectrum is essentially the Fourier transform of the modulated digital data. When digital data modulates an RF carrier, the rise and fall times of the transmitted RF pulses at the transitions between data bits, are determinative of the transmitted frequency spectrum. Thus, the faster the rise and fall times between logic states of sequentially transmitted bits of information, the broader the transmitted frequency spectrum and the higher is the undesirable sideband energy.

When the rise and fall times are slowed, the frequency spectrum naturally narrows; however, the bit error rate is degraded. Thus, there is a design tradeoff between the spectral efficiency and the bit error rate performance.

The rise and fall times of the data transitions can be slowed or shaped with the use of a pulse-shaping filter to reduce power spectrum sidelobe levels. Various filters have been employed to produce, for example, Gaussian or Bessel function type pulse shapes. These filters can be used in conjunction with any of a number of modulation schemes, such as Binary Frequency Shift Keyed (BFSK) modulation or Minimum Shift Keyed (MSK) modulation. The frequency sideband power can readily be predicted from the pulse shaping function using conventional Fourier transform analysis.

Figure 1:
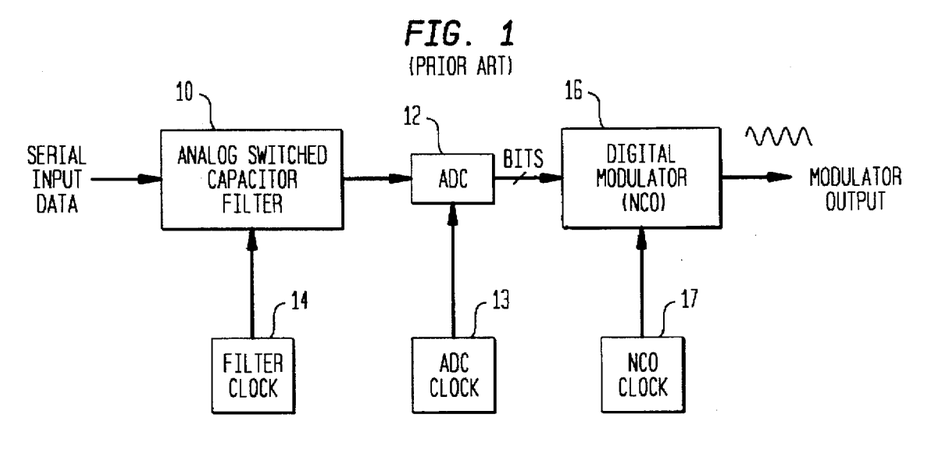
FIG. 1 illustrates a prior art pulse shaping filter using an analog approach.

Shown in FIG. 1 is a common analog pulse-shaping filtering technique using an analog switched capacitor filter. This technique affords low power consumption and small size. Serial input data is applied to the analog switched capacitor filter 10, which, in conjunction with a filter clock 14, smoothes the transitions between data pulses to a predetermined shape. The filtered pulses are then applied to an analog to digital converter (ADC) 12 where they are sampled at a rate controlled by an ADC clock 13. The ADC 12 then provides digital control words to a digital modulator 16, which control words are indicative of the amplitude levels at the sampled points along the filtered data pulses. The digital modulator 16 is typically a numerically controlled oscillator (NCO) driven by an NCO clock 17, whereby a carrier is modulated according to the control words. For example, if the modulator 16 is employed to provide BFSK modulation, a first frequency f1 will be transmitted to represent binary "one" data, a second frequency f2 will be transmitted to represent binary "zero" data, and frequencies which gradually taper from f1 to f2 and vice versa will be transmitted to represent the transitions between the one's and zero's.

One problem with the analog switched capacitor filter technique is that it inherently produces an asymmetric pulse response in which the rise time differs from the fall time. At the demodulator on the receiving end, this asymmetric pulse response produces different bit synchronizer timing errors as the sampling deviates from the optimum sampling point. Moreover, the optimum sampling point is undesirably not in the center of the pulse. response. Another drawback is the introduction of a DC offset and nonlinear distortion by the ADC. The DC offset results in a frequency error term that is directly proportional to the DC offset level.

Other shortcomings of the above analog approach are likewise apparent. A highly stable clock is required for the switched capacitor filter in order minimize filter response changes. The input digital data and bit symmetry must also be highly accurate to ensure adequate pulse shaping by the filters. Moreover, monolithic integration undesirably requires the integration of analog and digital components.

It is therefore an object of the present invention to provide an all digital pulse shaping circuit, which can be easily manufactured as a monolithic integrated circuit, and which overcomes the above-noted problems of the prior art.

SUMMARY OF THE INVENTION

The present invention is directed towards a digital pulse shaping circuit for reducing undesirable frequency components in subsequent data modulated transmissions, which circuit can be easily manufactured as a monolithic integrated circuit. In a preferred embodiment, the pulse shaping circuit employs an edge detector circuit to detect data transitions of an incoming serial data stream. Upon a data edge detection, the edge detector provides a control signal to a digital counter to enable the counter to begin counting applied clock pulses and generate a linear count. The linear count is provided to a decoding circuit, which generates an output word as a nonlinear function of the value of the count. For consecutive data bits of the same logic level no data transitions are detected. Latching circuitry is used to stop the counter at either its maximum or minimum count value dependent upon the count state of the last data transition. The decoder output word then drives a digital modulator which modulates an RF carrier to provide wireless data transmission with improved spectral efficiency.

BRIEF DESCRIPTION OF THE FIGURES

For a full understanding of the present invention, reference is made to an exemplary embodiment thereof, considered in conjunction with the accompanying drawings, in which:

FIG. 5 depicts a circuit arrangement for the 3:1 majority logic decoder of FIG. 2;

DETAILED DESCRIPTION OF THE INVENTION

Figure 2:
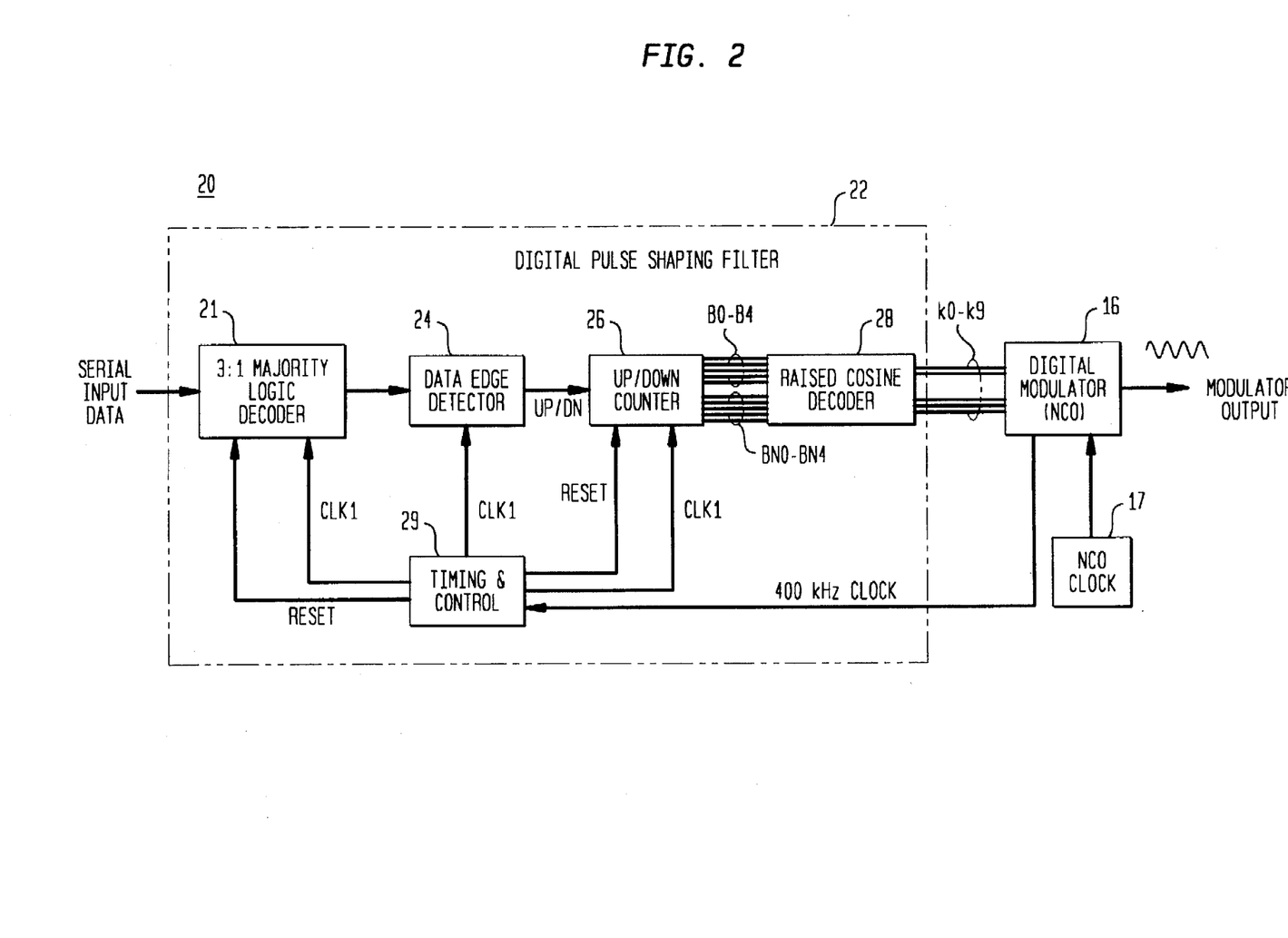
FIG. 2 shows a block diagram of a preferred embodiment of a digital pulse shaping circuit according to the present invention.

Referring to FIG. 2, a preferred embodiment of a digital pulse shaping circuit 20 according to the present invention is presented in block diagram format. As will be explained below, the circuit 20 advantageously utilizes an all digital design to provide pulse shaping of digital input data and thereby enable efficient spectral utilization during subsequent RF modulated transmission.

At the outset, serial input data which may be binary logic representative of voice, video, facsimile or other information, is applied to a 3:1 majority logic decoder circuit 21 of the digital pulse shaping filter 22. For illustration purposes, it will be assumed that the serial input data is applied to the filter 22 at a data rate of 20 kb/s. A timing and control block 29 provides clock signals designated "CLK1" at an exemplary clock rate of 400 kHz to the 3:1 majority logic decoder 21 as well as to a data edge detector 24 and to an up/down counter 26. The 3:1 majority logic decoder 21 functions to synchronize the serial input data with the 400 kHz clock. As a result, the data clock used to generate the input data stream and the 400 kHz filter clock (within timing and control block 29) do not require a specific phase relationship.

The 3:1 majority logic detector output is applied to the data edge detector 24 which produces a control signal designated "UP/DN" to the up/down counter 26. The UP/DN signal will be a logic level HIGH after a positive going edge of the input data stream is detected, i.e., following data bit transitions from zero to one. Likewise, the UP/DN signal is a logic level LOW following negative going bit transitions from one to zero.

Figure 3:
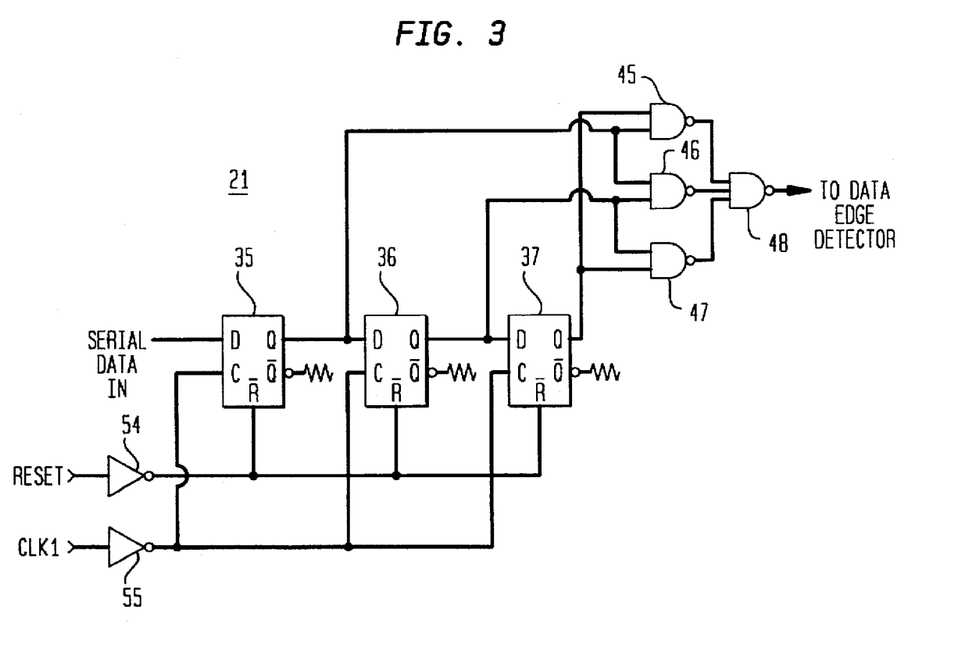

An exemplary circuit configuration for the 3:1 majority logic decoder 21 is shown in FIG. 3. The decoder 21 includes resettable clocked D flip flops 35-37, NAND gates 45-48, inverter 54 and buffer 55. The flip flops 35-37 are responsive to a rising edge transition of a RESET signal supplied by the timing and control circuit 29 to reset the NAND gate 48 output to a logic LOW. The incoming serial data is applied to the D input of flip flop 35 while the CLK1 pulses are applied via the buffer 55 to each clock input terminal of the flip flops. As will be readily understood from the shown circuit, the output of the NAND gate 48 will be a logic LOW when the incoming serial data bit is LOW. Then, when the incoming data transitions to a HIGH, the NAND gate 48 output will transition from LOW to HIGH only when two subsequent clock pulses are received. Likewise, when the incoming data stream transitions from a HIGH to a LOW, the NAND gate 48 output will not change its current HIGH state to a LOW until two subsequent CLK1 pulses are received. Accordingly, the circuit 21 operates to prevent subsequent errors in the timing when the CLK1 pulse edge transitions substantially coincide with the incoming data pulse transitions.

Referring again to FIG. 2, the up/down counter 26 responds to a HIGH UP/DN signal by incrementing its output count each time it receives a subsequent incoming CLK1 pulse. Likewise, when UP/DN is LOW thus indicating a falling edge on an input data pulse, the output count is decremented each time a subsequent CLK1 pulse is received. The up/down counter 26 is preferably a conventional presettable asynchronous counter readily manufactured as an integrated circuit. Its output "count" is provided as a digital word on the output lines B0 to B4 with the B0 line carrying the least significant bit and with the B4 line carrying the most significant bit. In addition, the complement of the output count is provided on output lines BN0 to BN4. Thus, if the word appearing on the B0 to B4 lines is all zeroes (00000), then the word on the BN0 to BN4 lines will be all ones (11111).

In the illustrative case, the input data rate is 20 kb/s (bit period of 50 μs) and the clock pulses CLK1 are applied at a 400 kHz rate (clock period of 2.5 μs). Hence, a maximum of 20 counts will be generated during the 50 μs time interval of each input data bit. The up/down counter 26 is thus configured as a five bit counter with 32 possible binary word combinations on the five output lines B0 to B4. It is understood that the number of bits needed will depend upon the ratio of the clock rate to the input data rate—i.e., the sampling rate.

The counter 26 is responsive to the rising edge of the incoming RESET signal pulse from the timing and control circuit 29 to provide a presettable count on output lines B0 to B4. This presettable count will be assumed in the exemplary case to be at the midpoint of possible counts, i.e. for a 5 bit counter the range is from 0 to 31 and the midpoint is 15. In addition, the counter 26 includes latching circuitry to stop upward and downward counts whenever the count reaches predetermined maximum and minimum values of 25 (11001) and 5 (00101), respectively. As such, 21 count steps are provided, resulting in 20 count steps corresponding to the number of samples per bit. Latching circuitry to implement such maximum and minimum counts is well known to those skilled in the art and thus the details of such will not be elaborated upon further.

With continuing reference to FIG. 2, the binary coded count and its complement on the output lines B0 to B4 and BN0 to BN4, respectively, are applied to a raised cosine decoder circuit 28, where each count is converted to a 10 bit parallel data word on lines K0 to K9. As the counter 26 counts, the output word or "count" on lines B0 to B4 changes linearly with time because the clock pulses CLK1 are periodic. This linear count is converted by the decoder 28 to a raised cosine function, with stepped amplitude levels of the raised cosine function represented by the 10 bit parallel data word. The digital modulator 16 then produces a modulated RF output transmission in accordance with the 10 bit word produced by the decoder 28. Advantageously, the digital modulator 16 is configured as a numerically controlled oscillator (NCO) so that input words representing minimum and maximum values will produce minimum and maximum output frequencies fmin and fmax, respectively. Input words representing values in between the minimum and maximum will yield corresponding output frequencies in between fmin and fmax.

Figure 4A:
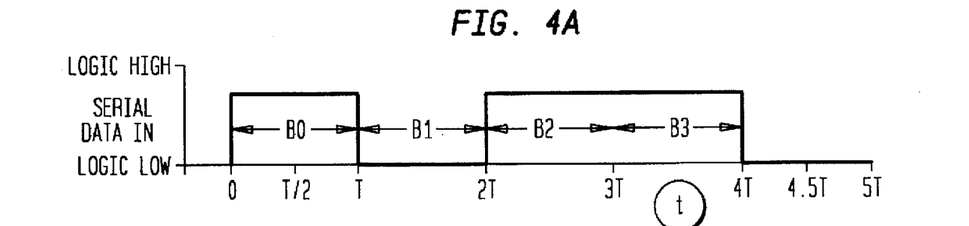
FIGS. 4A–4F are timing diagrams illustrating the interrelationships between the various signals and digital words of the circuit of FIG. 2.
Figure 4B:
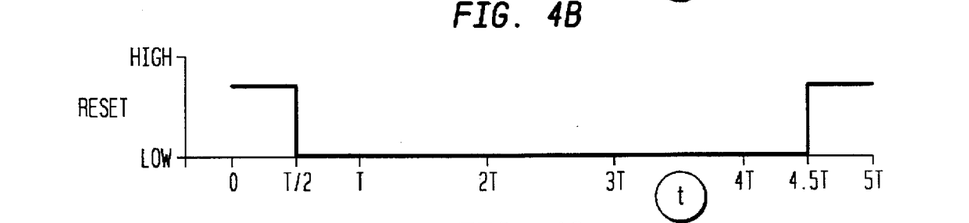
Figure 4C:
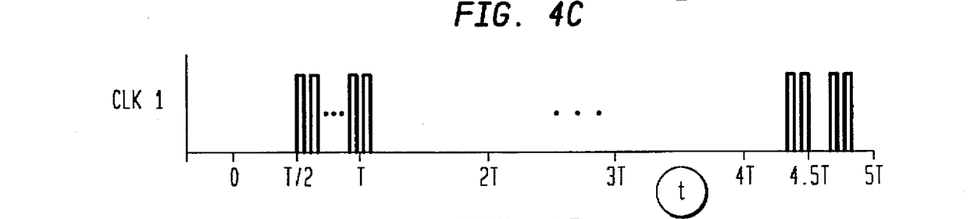

The timing diagrams of FIGS. 4A-4F illustrate the interrelationships between the serial input data stream, the clock signals and the various signals generated by the circuit components of FIG. 2. Shown in FIG. 4A is an input data stream consisting of four bits D0 to D3 with each bit occupying a time interval of T μs. D0 represents the least significant bit and D3 is the most significant bit to provide a data word (D3 to D0) of 1101 as shown. At a time T/2 μs following the leading edge of the first bit D0, the timing and control circuit 29 generates a logic LOW reset signal and starts applying clock pulses CLK1 to the majority logic decoder 21, data edge detector 24 and counter 26 (FIGS. 4B-4C). Prior to t=0, the RESET signal resets the 3:1 majority logic decoder 21 output to a logic LOW, as discussed above, while simultaneously resetting the count of up/down counter 26 to a preset state of 01111 (corresponding to a decimal value of 15).

Figure 4D:
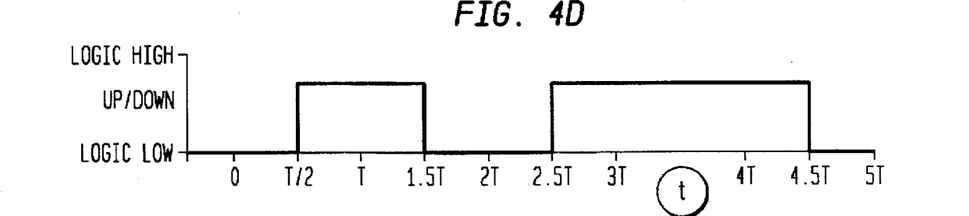
Figure 4E:
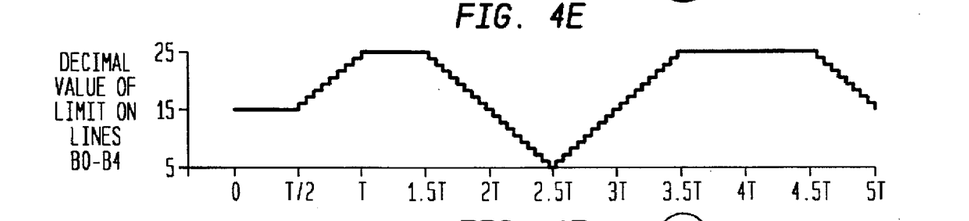
Figure 4F:
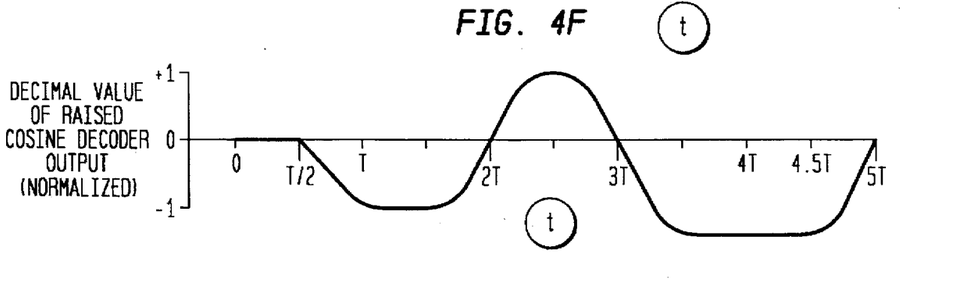

Responding to the rising edge of the D0 bit at the time t=0, the data edge detector 24 provides the UP/DN signal as a logic HIGH at the delayed time of t=T/2, as shown in FIG. 4D. The counter 26 is thus controlled to count upwards from its preset state as each CLK1 pulse is applied. From the time T/2 to T, the output count is incremented from 15 to 25 (FIG. 4E) since 10 CLK1 pulses at a 400 kHz rate are applied during the 25 μs between T/2 and T. As the count is incremented during this time interval, a staircase approximation to the raised cosine function is produced on the output lines K0–K9 of the raised cosine decoder 28 (FIG. 4F). The normalized decimal value represented by the word on K0–K9 is incremented from 0 to −1 during the interval of T/2 to T.

The solid curve in FIG. 4F represent the ideal raised cosine function which is approximated by the parallel data words on bit lines K0–K9. Of course, the higher the sampling rate (CLK1 rate) and the higher the number of output bits employed by the raised cosine decoder 28, the closer the approximation of the desired smoothing function. In the exemplary case, each bit line K0–K9 is used to carry one bit of a 10 bit parallel data word; however, is it understood that more or less bits can be employed trading off circuit complexity with the accuracy of the approximation.

Next, at the time T, the serial input data transitions to a logic LOW whereupon the data edge detector 24 detects the negative edge of the transition and changes the state of the UP/DN signal to a LOW at time 1.5 T. This causes the count to reverse direction whereby a downwardly linear count is begun. The downward count continues until the time 2.5T where a minimum count of 5 is reached. As shown in FIG. 4F, the downward count causes the raised cosine decoder output to likewise reverse direction, whereby the normalized decoder output gradually tapers from −1 to +1 during the time interval from 1.5 T to 2.5 T. It is thus apparent that relatively sharp serial input data bit transitions from one logic state to the other, are translated to gradual transitions between extreme values of the filter 28 output with each gradual transition taking one bit period T.

At the time 2 T, the serial data changes logic state again between the bits D1 and D2. Consequently, the UP/DN signal reverts HIGH at 2.5 T, the count reverses direction, and the raised cosine function increments downwardly between the time 2.5 T and 3.5 T. At the time 3 T, the next data bit D3 arrives at the same logic HIGH level as the previous bit D2. As such, no data transition is detected and the UP/DN signal remains at its current HIGH state. As described above, the up/down counter 26 employs latching circuitry to stop upward counts once the count reaches a predetermined maximum count of 11001, or 25. Thus the count will remain at the maximum of 25 until the UP/DN signal switches LOW. Since the count remains latched, the decoder 28 output level also remains constant at −1 between 3.5 T and 4.5 T.

At the time 4 T, the 4 bit code word of the input serial data stream is complete whereupon the timing and control circuit 29 responds by returning the RESET signal to a logic HIGH at time 4.5 T and stopping the CLK1 signals exactly one half of a period later at the time 5.0 T. In the meantime, the UP/DN signal switched LOW at the time 4.5 T, resulting in the downward count and decoder 28 response as shown in FIGS. 4E and 4F.

Figure 5:
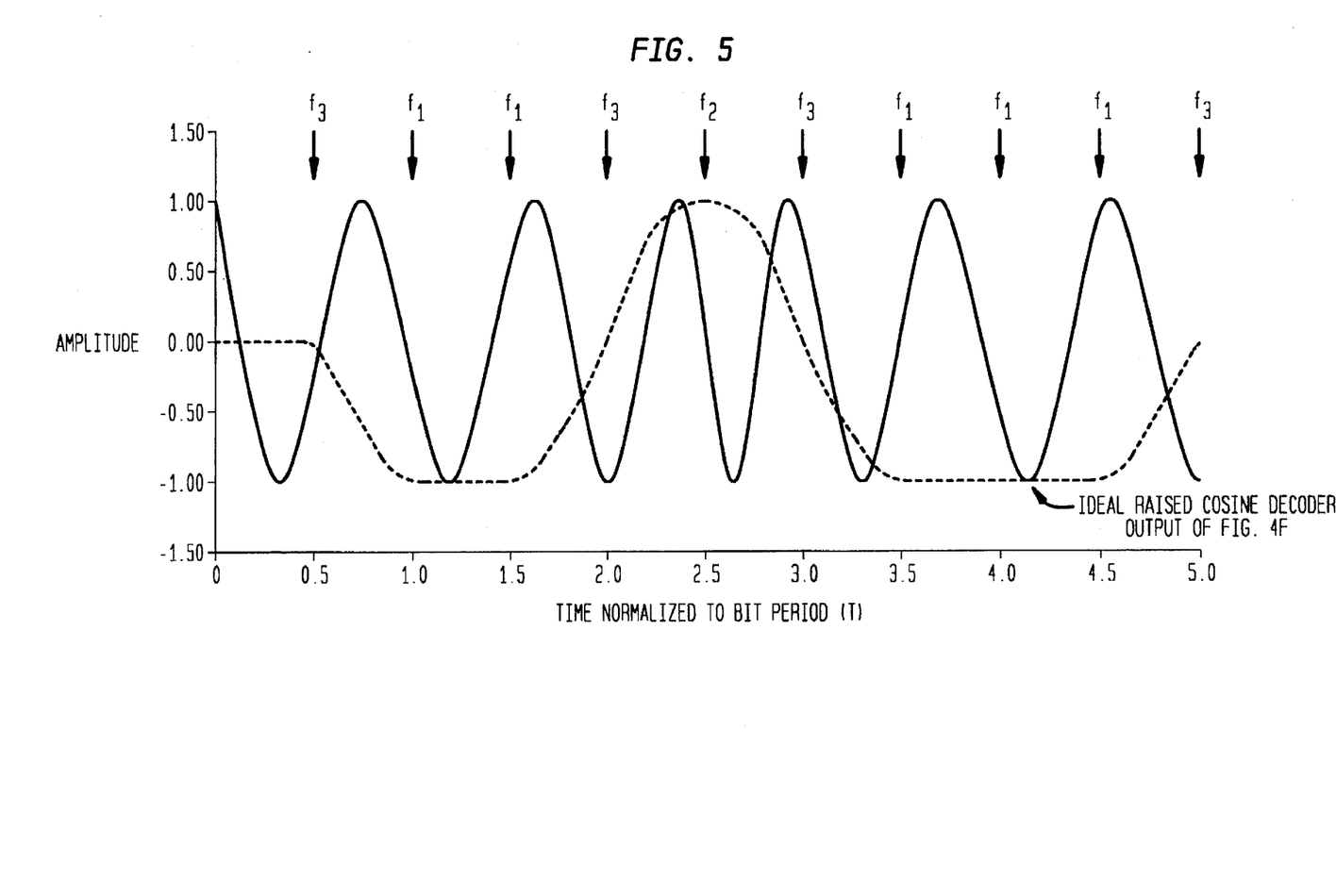
FIG. 5 shows an exemplary frequency modulated output of the digital modulator of FIG. 2.

Referring now to FIG. 5, it is seen that the digital modulator 16 output waveform has an instantaneous frequency which changes according to the raised cosine decoder 28 output of FIG. 4F (shown in FIG. 5 as a dotted line superimposed with the modulator output waveform). A minimum frequency f1 is produced when the normalized decoder output is at its minimum level of −1; a maximum frequency of f2, is provided when the normalized decoder output is at +1. When the normalized decoder output corresponds to zero, the modulator output frequency is f3=(f1+f2)/2. The instantaneous frequency in between f1, f2 and f3 varies proportionally to the decoder output value, as in conventional FM.

With conventional FSK modulation, binary 1's are represented by a first frequency f1 while binary 0's are represented by a second frequency f2. The modulation scheme of FIG. 5 appears similar to FSK only when N consecutive data bits are of the same binary state, where N is an integer greater than one. In this case, a constant frequency of a value corresponding to a given logic level will be transmitted, but only during N−1 bit intervals, as for example during the time interval from 3.5 T to 4.5 T. On the other hand, following data bit transitions, the FIG. 5 modulation scheme is unlike FSK, since the frequency changes from f2 to f1, or vice versa, over an entire bit interval (see, e.g., the 1.5 T–2.5 T time interval). It should be understood that the data bit information during that transition is not lost—the gradual transition merely represents that the bit state during the one bit long gradual transition, is the opposite state of that represented by the previous bit interval. The demodulation and decoder circuitry at the receiving station will thus need to be configured to extract the original incoming serial data stream from the frequency modulated transmission. For instance, in the time interval between 0 and T, the frequency changes from f3 to f1—a negative change which indicates that the first bit of the data stream is a "1". On the other hand, if the first bit were a zero, the count of FIG. 4E would be upward between T/2 and T, causing the decoder output slope of FIG. 4F to be positive during that time. Then, the modulator output frequency would have a positive slope as it transitions from f3 to f2 during t=T/2 to t=T, thereby indicating that the first serial data bit is a 0.

Figure 6:
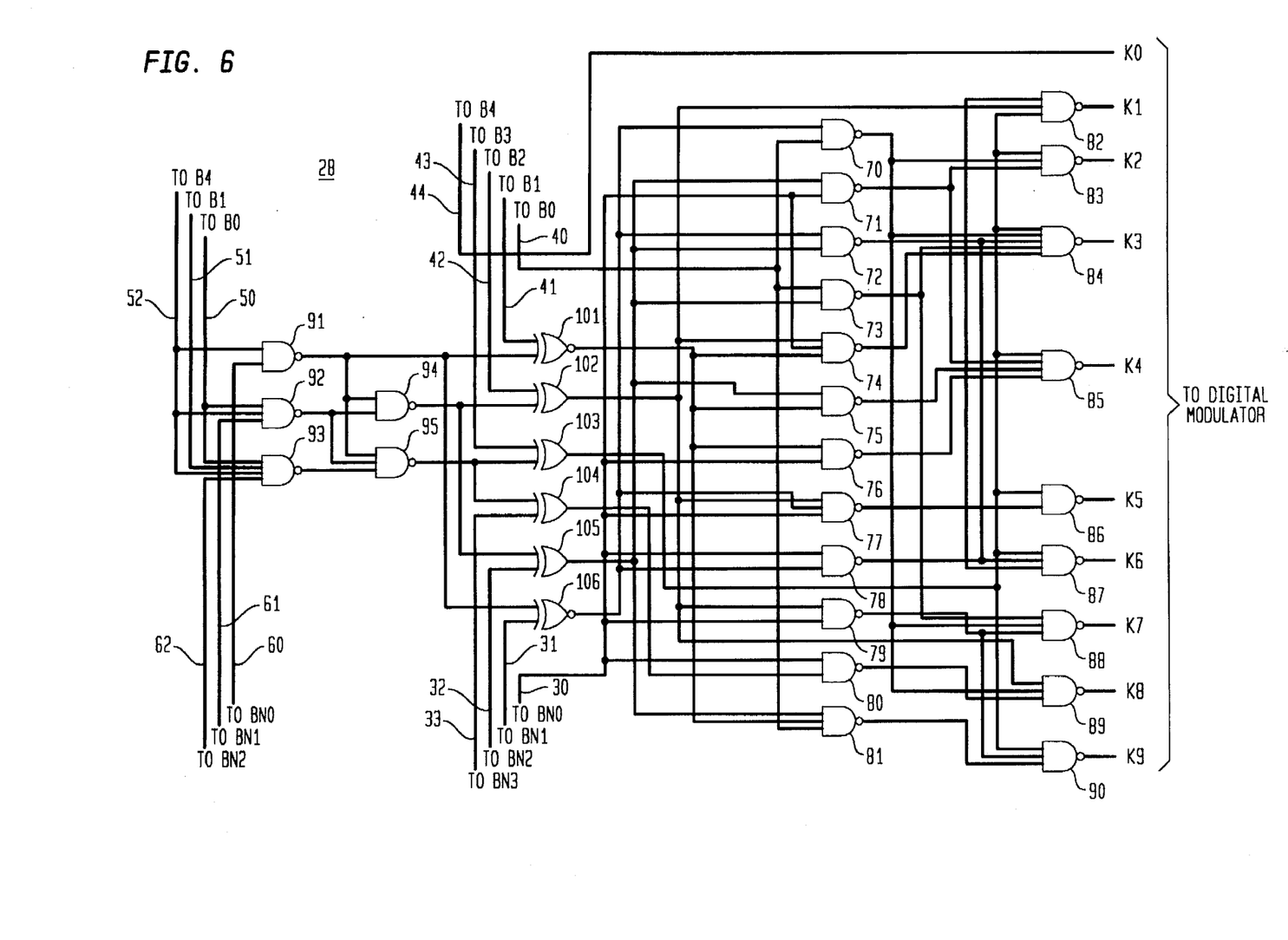
FIG. 6 shows a preferred circuit arrangement for the raised cosine decoder of FIG. 2.

Referring now to FIG. 6, exemplary decoder circuitry for the raised cosine decoder 28 is shown. The decoder 28 includes NAND gates 70–95, exclusive OR (XOR) gates 102–105 and exclusive NOR (XNOR) gates 101 and 106. NAND gates 70–73, 75–76, 78–80, 86, 91 and 94 are dual input NAND gates; the other NAND gates have more than two inputs. Input lines 40–44 receive the data bits on lines B0–B4, respectively, of the up/down counter 26; input lines 30–33 receive data bits on the lines BN0–BN3, respectively of up/down counter 26. Input lines 60–62 are coupled to lines BN0–BN2, respectively; lines 50–52 are coupled to lines B0, B1 and B4 respectively. The 10 bit output word on lines K0–K9 is formed with the bit on line K0 corresponding directly to that on line B4 and with the outputs of NAND gates 82–90 forming the respective bits of lines K1–K9.

Figure 7:
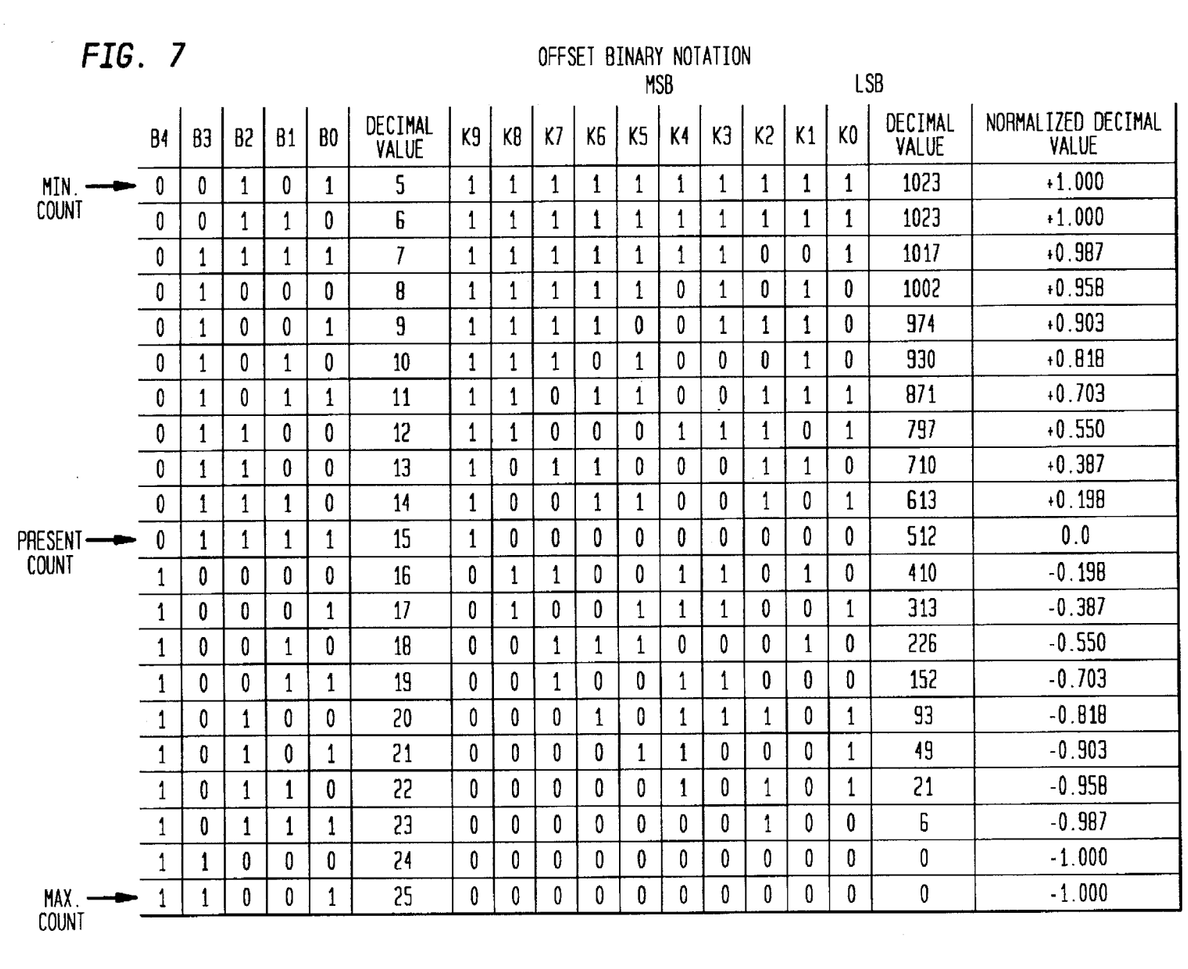
FIG. 7 depicts a table that defines the relationship between the up/down counter output and the raised cosine decoder output of FIG. 6.

The table of FIG. 7 shows the 10 bit parallel output word formed on the bit lines K0–K9 corresponding to each possible input word on the input bit lines B0–B4 (and BN0–BN4). One skilled in the art can readily follow the input data word on B0–B4 through the circuit of FIG. 6 to arrive at the output words on K0–K9 and thus there is no need to elaborate further on the decoding operation. Following serial input data edge transitions, the count on lines B0–B4 is linearly incremented or decremented, which causes the normalized decimal value of the 10 bit output word to be an approximation of the raised cosine function defined by the equation $$p(t) = \pm((1-(2t/T)) + (1/\pi)\sin(2\pi t/T)) \qquad \text{eqn.(1)}$$

where t is time, T corresponds to the data period, and the raised cosine function p(t) is defined over the time interval from 0 to T seconds.

Experimental data was taken on a digital pulse shaping circuit configured in accordance with the circuit 20 of FIG. 2, employing the 10 bit data word approximation to eqn. (1), and driving a numerically controlled oscillator, with a 20 Kb/s serial input data rate and a 400 kHz sampling rate. The percentage of the total output modulator power in a 25 kHz bandwidth centered about a carrier frequency on the order of 100 MHz was measured at 99.28%, a desirable result.

It will be appreciated that the digital pulse shaping circuit 20 of FIG. 2 can be readily manufactured as a single chip monolithic integrated circuit. In addition, the circuit 20 can be easily integrated in an Application Specific Integrated Circuit (ASIC) with other functions.

A myriad of advantages are provided by the circuit 20 over the analog approaches of the prior art. Since the filtering operation is performed digitally, the digital pulse shaping filter technique does not require accurate voltage levels for the serial input data as does the analog approach. It only becomes necessary to distinguish the binary 1's from the 0's. Moreover, the DC offset associated with the ADC of the prior art approaches is removed which in turn eliminates inherent frequency offset. Furthermore, since AC coupling is not required to reduce DC offset problems at the filter input and output, no degradation for long 1 or 0 data patterns is introduced. With no ADC required, the ADC nonlinear distortion is also removed. Additional advantages of the above-disclosed digital implementation over analog are the tight control filter parameters and no component drift vs. time and temperature.

Finally, the digital approach presented herein overcomes bit symmetry problems by detecting data transition edges only and controlling bit symmetry using the clock within the timing and control circuitry. Since data transition edges are detected, the data clock and digital filter sampling input clock do not have to be locked to the same phase.

It will be understood that the embodiment described herein is merely exemplary and that many modifications and variations can be made, such as to the values given for the clock and data rates and the digital word lengths, without departing from the spirit and scope of the invention. For instance, the decoder circuitry can be modified to provide the capability to generate the pulse-shaping responses required for Gaussian Minimum Shift Keyed (GMSK) Modulation—the European cellular standard; Tamed Frequency Modulation (TFM); or π/4 Differential Quad Phase Shift Keyed (DQPSK) modulation—the North American cellular standard. All such modifications and variations are intended to be included within the scope of the invention as defined by the appended claims.

What is claimed is:

1. A filter for shaping data edge transitions between bits of an incoming data stream, comprising:

edge detection means for detecting transitions between consecutive bits of different logic levels of the incoming data stream;

counting means, coupled to said edge detection means, for generating a digital count whenever said transitions between consecutive bits are detected;

a timing and control circuit coupled to said counting means for generating a reset signal at a predetermined time following the application of a first data bit of said incoming data stream to said filter, wherein said counting means is responsive to said reset signal to preset its count to a predetermined starting count in between a given minimum count and a given maximum count; and decoding means, coupled to said counting means, for generating a digital word as a predetermined nonlinear function of the value of said digital count, whereby sharp data transitions of the incoming data stream are converted to tapered data transitions thereby reducing undesirable frequency spectrum components in subsequent modulated data transmissions.

2. The filter according to claim 1, wherein said predetermined nonlinear function is defined by the following equation:

$$p(t)=\pm((1-(2t/T))+(1/\pi)\sin(2\pi t/T)),$$

where p(t) is the decimal value of the digital words generated by said decoding means, t is time, and T is the data bit period of the incoming data stream, and wherein p(t) is positive and negative, respectively, following positive and negative transitions between adjacent bits.

3. The filter according to claim 1, further comprising clock generating means, coupled to said counting means, for supplying clock pulses to said counting means at a clock rate greater than the incoming data stream data bit rate, wherein said counting means updates the digital count with each said clock pulse applied thereto.

4. The filter according to claim 3, wherein said edge detection means generates a control signal of a first logic level when a positive going edge of the incoming data stream is detected, and of a second logic level when a negative going edge of the incoming data stream is detected, said control signal being supplied to said counting means;

wherein said counting means increments its count, with every said applied clock pulse when said control signal is at said first logic level, and decrements its count with every said applied clock pulse, when said control signal is at said second logic level.

5. The filter according to claim 4, wherein said counting means comprises a presettable asynchronous counter.

6. The filter according to claim 5, wherein said presettable asynchronous counter includes means for terminating the incrementing of its count upon reaching said given maximum count, and means for terminating the decrementing of its count upon reaching said given minimum count.

7. The filter according to claim 1, wherein said incoming data stream has a bit period of T seconds, and wherein the value of said digital word generated by said decoding means change from a first extreme value to a second extreme value over a time interval of said T seconds following a data edge transition detection.

8. The filter according to claim 7, wherein said first extreme value is a maximum value, said second extreme value is a minimum value, and wherein said digital word changes from said maximum value to said minimum value over a time interval of T seconds following a positive going data edge transition, said digital word changing from said minimum value to said maximum value over a time interval of T seconds following a negative going data edge transition.

9. The filter according to claim 1, wherein said predetermined nonlinear function is a raised cosine function.

10. The filter according to claim 3, further including a majority logic decoder coupled to said edge detection means and to said clock generating means for synchronizing said incoming data stream with said clock pulses of said clock generating means.

11. The filter according to claim 10, wherein said majority logic decoder comprises first, second and third clocked D flip flops each having D and clock input terminals and Q output terminals; and first, second, third and fourth NAND gates, with each said clocked D flip flops receiving said clock pulses at their respective clock input terminals; and wherein, said incoming data stream is applied to the D input of said first flip flop, said Q output of said first flip flop is coupled to a first input of said first NAND gate and a first input of said second NAND gate and to the D input of said second flip flop, with the Q output of said second flip flop being coupled to a second input of said second NAND gate and to a first input of said third NAND gate and to the D input of said third flip flop, with the output of said third flip flop coupled to a second input of said first NAND gate and to a second input of said third flip flop, and with the outputs of each of said first, second and third NAND gates coupled to inputs of said fourth NAND gate, wherein the output of said fourth NAND gate is coupled to said data edge detection means.

12. The filter according to claim 7, wherein said digital word generated by said decoding means remains at said second extreme value for a period of at least said T seconds when consecutive data bits of said incoming data stream are at the same logic level.

13. Apparatus for producing a frequency modulated transmission representative of an incoming serial data stream, comprising:

edge detection means for detecting transitions between adjacent bits of different logic levels of the incoming data stream;

counting means, coupled to said edge detection means, for generating a digital count whenever said transitions between adjacent bits are detected;

a timing and control circuit coupled to said counting means for generating a reset signal at a predetermined time following the application of a first data bit of said incoming data stream, wherein said counting means is responsive to said reset signal to preset its count to a predetermined starting count in between a given minimum count and a given maximum count;

decoding means, coupled to said counting means, for generating a digital word as a predetermined nonlinear function of the value of said digital count; and numerically controlled oscillator means, coupled to said decoding means, for providing a continuous wave output having an instantaneous frequency according to said digital word.

14. The apparatus according to claim 13 wherein said instantaneous frequency tapers from a first extreme frequency to a second extreme frequency, over a time interval corresponding to one bit period of the incoming data stream, whenever a data edge transition is detected.

15. A method for shaping data edge transitions between bits of an incoming data stream, comprising the steps of:

detecting data edge transitions between adjacent bits of different logic levels of the incoming data stream;

counting clock pulses, whenever a data edge transition is detected, to generate a digital count;

presetting said digital count to a predetermined starting count in between a given minimum count and a given maximum count following the application of a first data bit of said incoming data stream; and decoding the digital count to provide a digital word of a predetermined nonlinear function of the value of said digital count, whereby sharp data edge transitions of said incoming data stream are converted to tapered data transitions and undesirable frequency spectrum components are reduced in subsequent modulated transmissions.

16. The method according to claim 15 wherein said nonlinear function is a raised cosine function.

17. The method according to claim 15 wherein said step of counting clock pulses further comprises:

counting in a positive direction when a positive data edge transition is detected, and counting in a negative direction when a negative data edge transition is detected.

18. The method according to claim 17, further comprising:

ceasing to count in an upward direction when a predetermined maximum count is reached; and ceasing to count in a negative direction when a predetermined minimum count is reached.

19. The method according to claim 18, further comprising:

frequency modulating an RF carrier at an instantaneous frequency according to said digital word.

20. The method according to claim 15, wherein said predetermined nonlinear function is defined by the following equation:

$$p(t)=\pm((1-(2t/T))+(1/\pi)\sin(2\pi t/T)),$$

where $p(t)$ is a decimal value of said digital word provided, $t$ is time, and $T$ is the data bit period of the incoming data stream, and wherein $p(t)$ is positive and negative, respectively, following positive and negative transitions between adjacent bits.

21. A filter for shaping data edge transitions between bits of an incoming data stream, comprising:

edge detection means for detecting transitions between consecutive bits of different logic levels of the incoming data stream;

counting means, coupled to said edge detection means, for recieving clock pulses and generating a digital count whenever said transitions between consecutive bits are detected;

a majority logic decoder coupled to said edge detection means for synchronizing said incoming data stream with said clock pulses, said majority logic decoder includes a NAND gate coupled to said edge detection means; and decoding means, coupled to said counting means, for generating a digital word as a predetermined nonlinear function of the value of said digital count, whereby sharp data transitions of the incoming data stream are converted to tapered data transitions thereby reducing undesirable frequency spectrum components in subsequent modulated data transmissions.

* * * * *